W. B. STORY.
SHEET INDIVIDUALIZING DEVICE.
APPLICATION FILED NOV. 11, 1915.
1,201,381.
Patented Oct. 17, 1916.
6 SHEETS—SHEET 1.
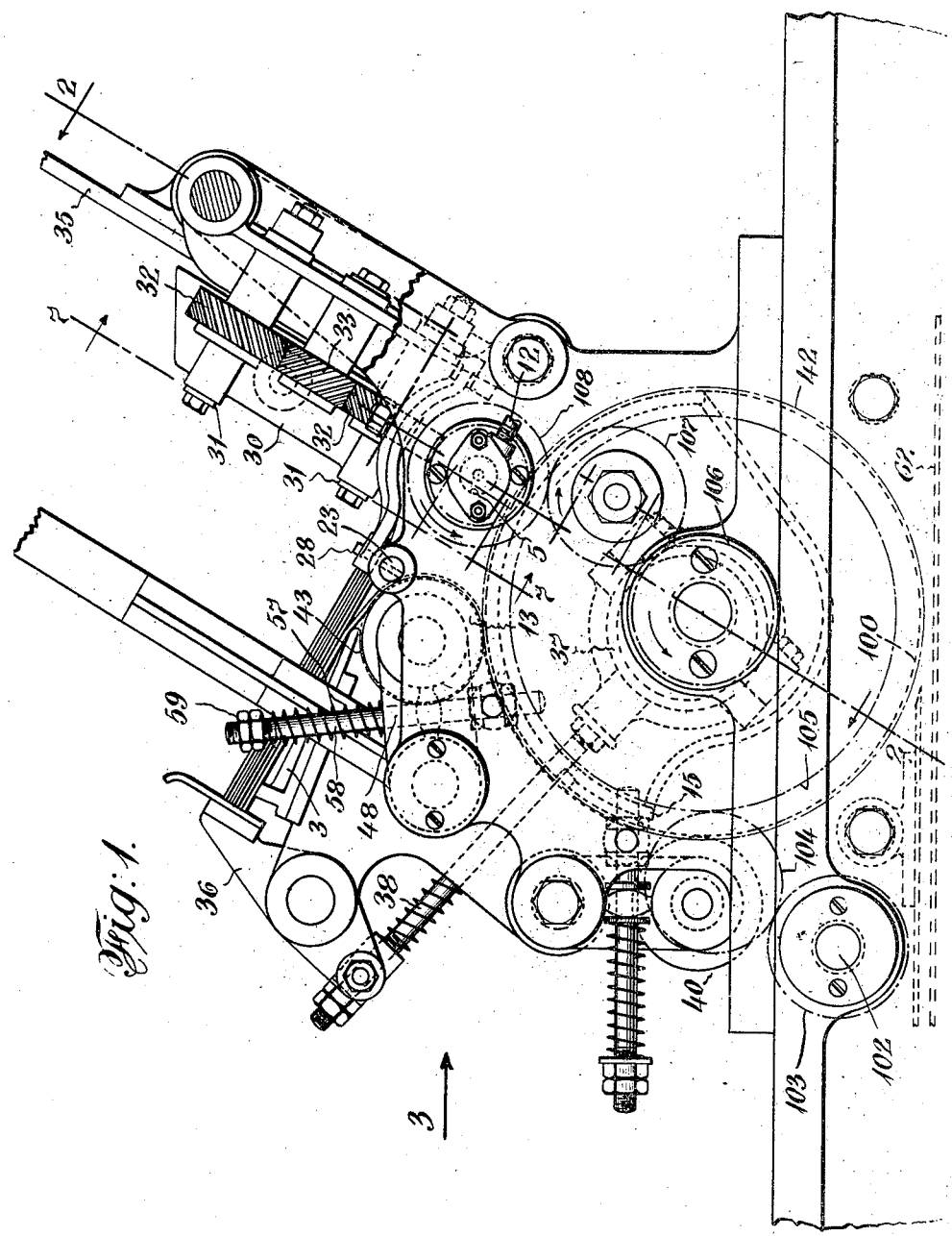
Inventor
Ward B. Story
By his Attorney

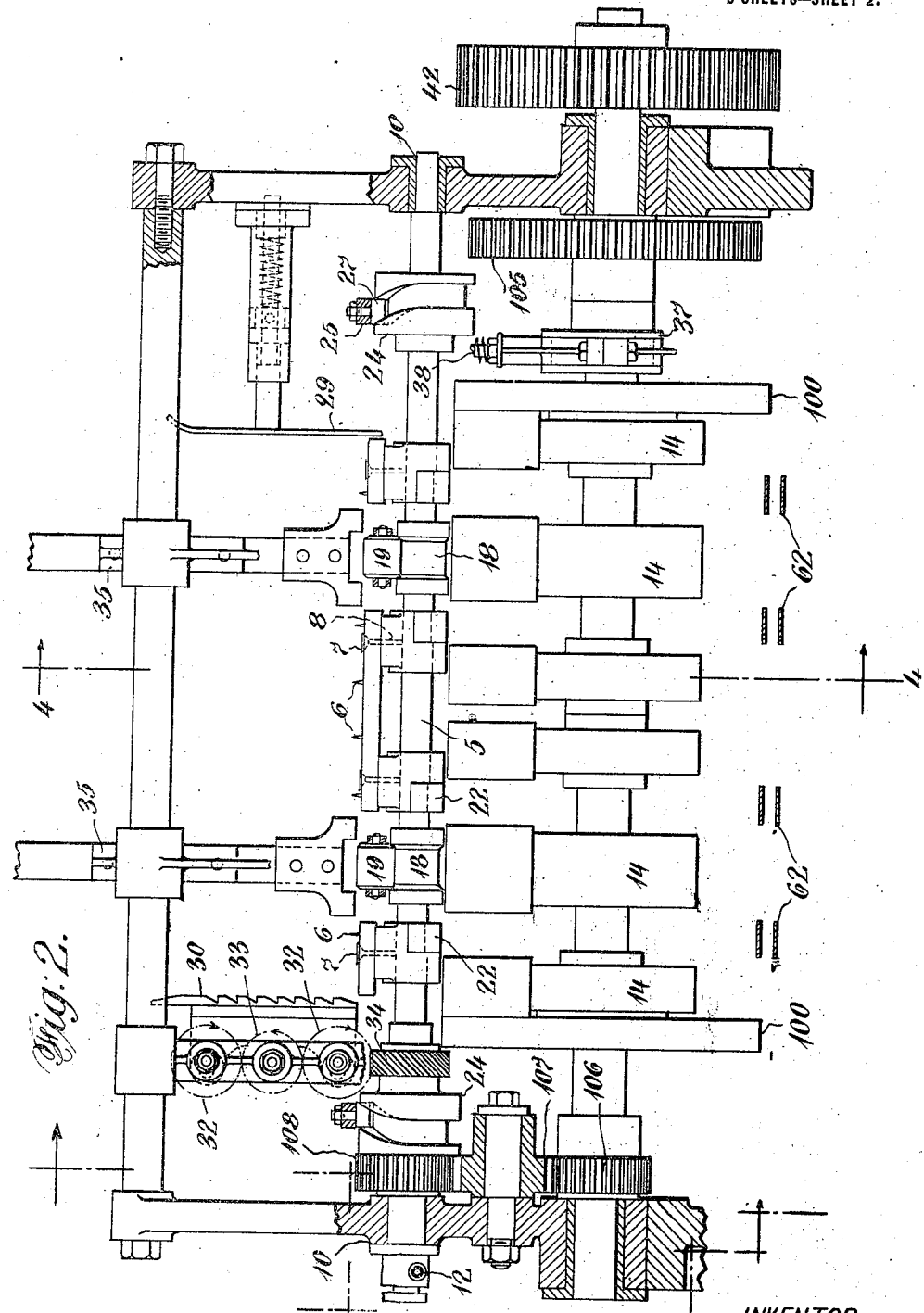

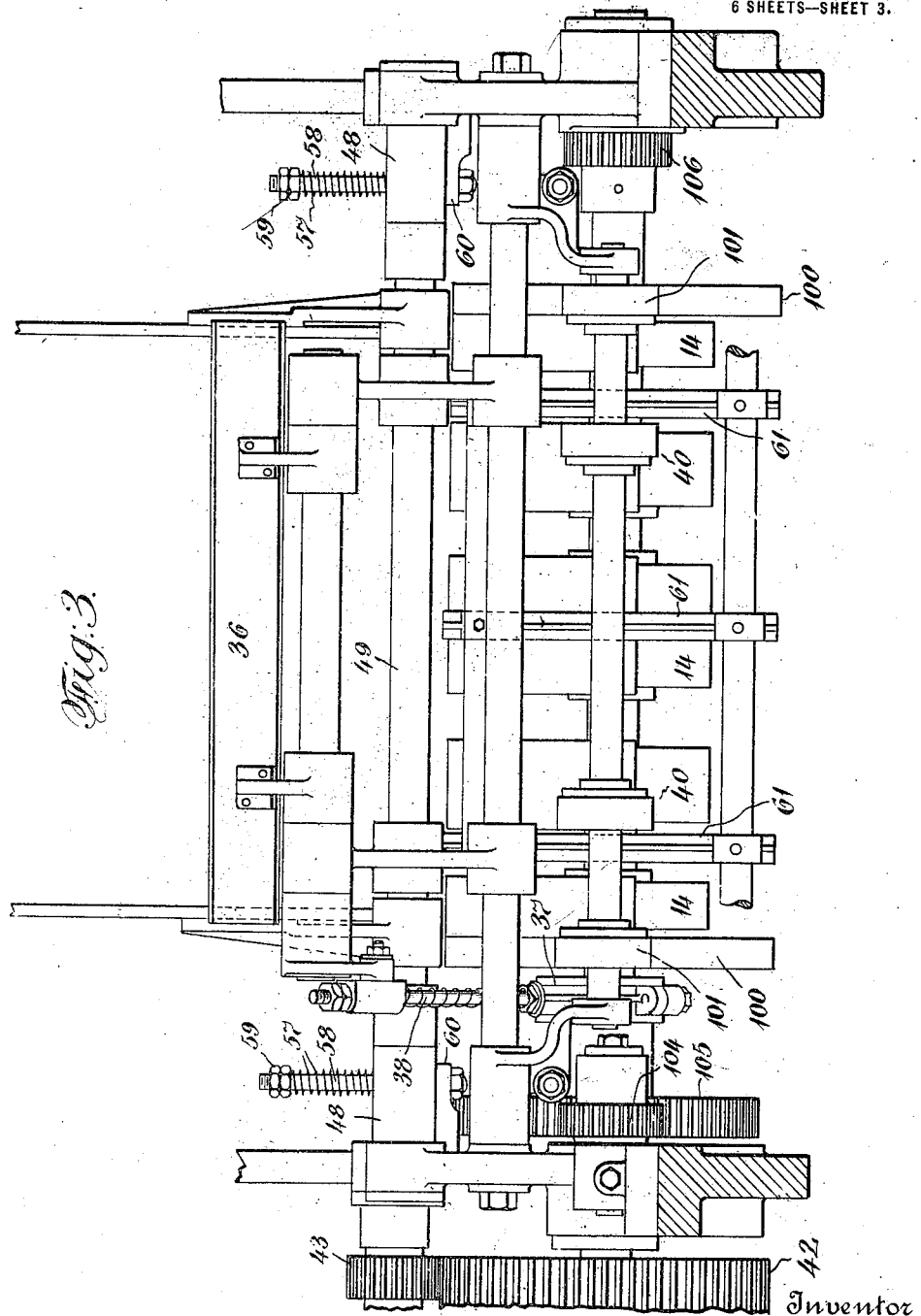

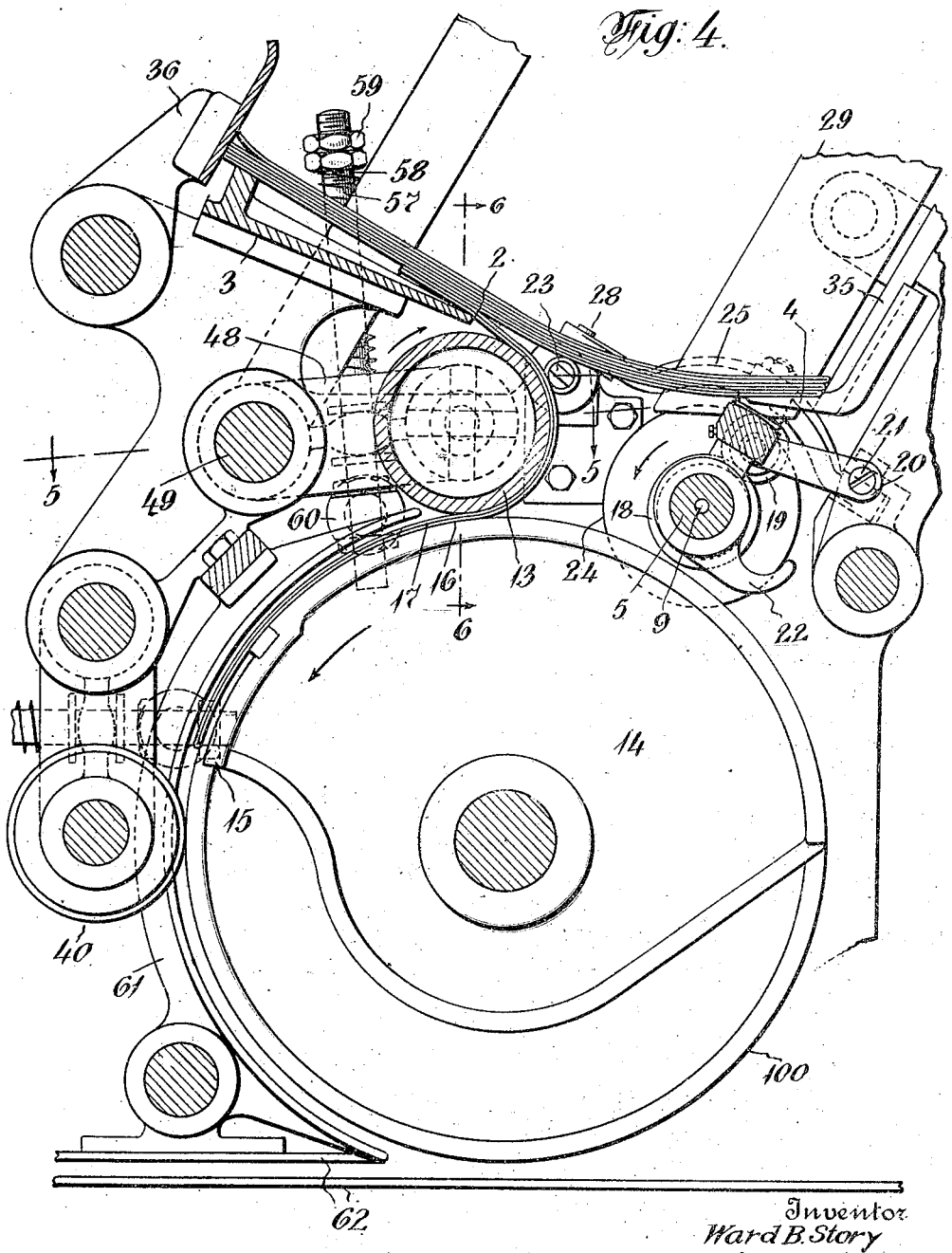

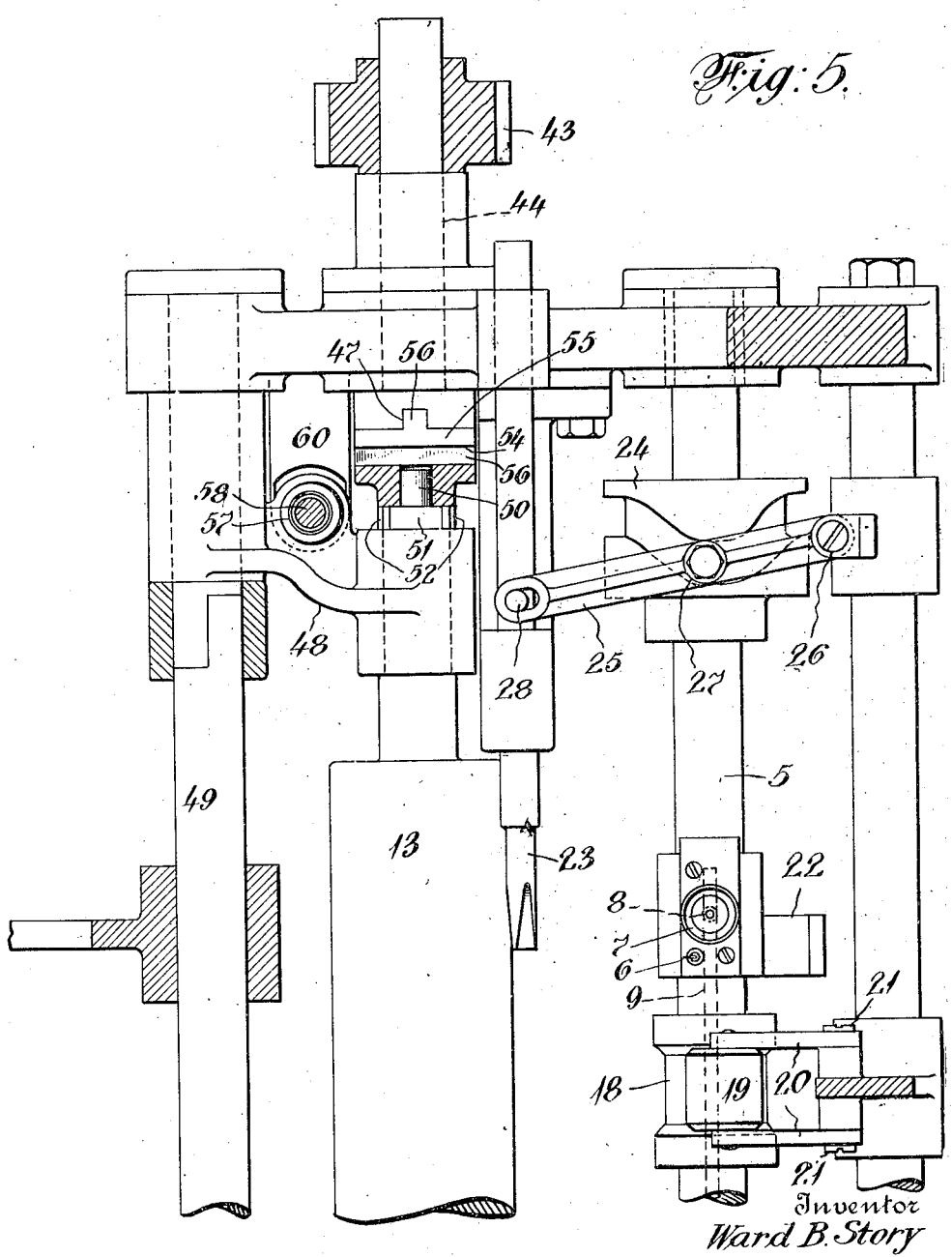

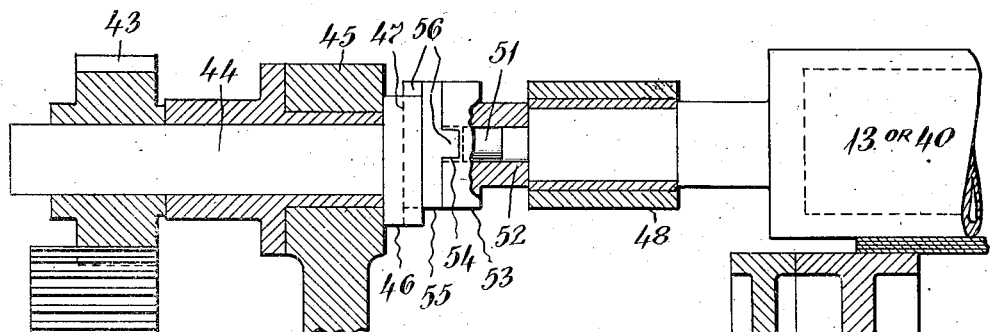
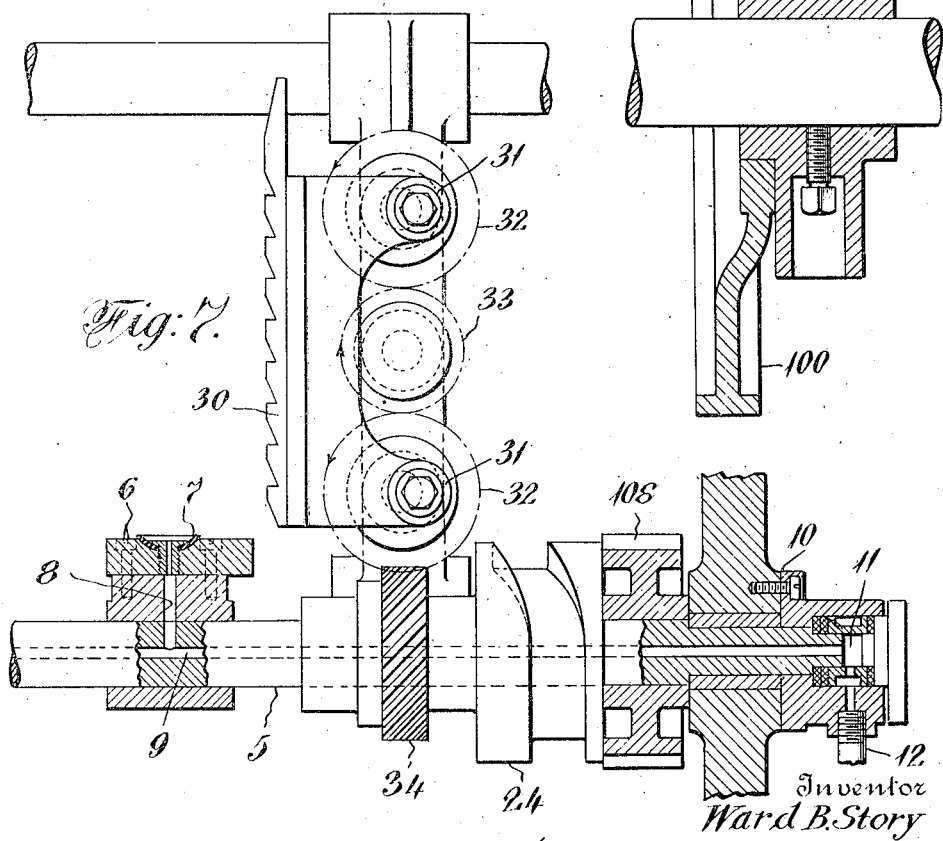

UNITED STATES PATENT OFFICE.

WARD B. STORY, OF NEW YORK, N. Y., ASSIGNOR TO AMERICAN ASSEMBLING MACHINE COMPANY, A CORPORATION OF DELAWARE.

SHEET-INDIVIDUALIZING DEVICE.

1,201,381. Specification of Letters Patent. Patented Oct. 17, 1916.

Application filed November 11, 1915. Serial No. 60,829.

*To all whom it may concern:*

Be it known that I, WARD B. STORY, a citizen of the United States, and a resident of the borough of Manhattan, in the county, city, and State of New York, have invented certain new and useful Improvements in Sheet-Individualizing Devices, of which the following is a specification.

The present invention relates generally to sheet individualizing devices, and has more particularly reference to means for separating newspaper sections for an inserting machine from a hopper containing them.

The main object of the invention is to produce a compact, simple and efficient construction which will insure the separation and feeding of the sections in a speedy and reliable manner.

To this end one feature of the invention consists of providing a rotating member below the bottom of the hopper containing the sections which will initially deflect the leading edge of the sheet out of the hopper, together with a second rotating member also below the hopper but rotating in a direction opposite to that of the first member, and a third rotating member acting to transfer the deflected leading edge from the first to the second rotating member and coöperating with said second member to feed the sheet out bodily.

Another feature of the invention resides in backfeeding means which rotate in a direction opposite to that of the rotating member which deflects the leading edge of the sheet and which acts against the next overlying sheet to retain it in the hopper. Preferably the back feeding means are operated from the said rotating means having its rotating movement imparted therefrom and being likewise raised into engagement with the bottom of the pile preferably by means of cams on the rotating means.

The rotating member which initially deflects the leading edge of the sheet may be provided with separating members of any suitable construction such as needles or suckers, or both, and a wiping device is provided on the rotating member for disengaging the sheet from the separating members.

If a sucker is utilized for a separating member, the rotating member will preferably be provided with a duct which connects with a chamber in a stationary bearing supporting the rotating member, and to this chamber is connected a suitable exhaust pipe leading to a blower or the like.

Suitable means are provided for jogging the pile, here taking the form of a jogging member which has a motion toward and downwardly with respect to the pile during the jogging motion and the jogging member is carried by two eccentrics rotating in the same direction, and the eccentrics are preferably operated from the rotating member carrying the separating members. In connection with this jogging member I may employ a spring-seated abutment member on the other side of the pile.

To properly support the pile during the removal of the lowermost sheet I provide slidable pile supporting means which move in under the pile and engage with the next overlying sheet. Preferably these slidable means are operated from the rotating member carrying the separating members.

Other features of construction, combination of parts, and arrangement of elements will appear as the specification proceeds.

In the accompanying drawings the invention is disclosed in a concrete and preferred form, from which, however, variations may be made without departing from the legitimate and intended scope of the invention.

In the said drawings: Figure 1 is a side elevation of a machine embodying the invention, partly in section. Fig. 2 is a vertical sectional view substantially on the line 2—2 of Fig. 1. Fig. 3 is an end view looking in the direction of the arrow 3 in Fig. 1 with parts omitted and in section. Fig. 4 is a sectional view substantially on the line 4—4 of Fig. 2. Fig. 5 is a sectional plan view substantially on the line 5—5 of Fig. 4. Fig. 6 is a detail sectional view substantially on the line 6—6 of Fig. 4. Fig. 7 is a sectional detail view substantially on the line 7—7 of Fig. 1.

Similar characters of reference indicate corresponding parts in the several views.

1 indicates a hopper or pile supporting means having an opening 2 at its bottom.

3 is a rear pile supporting means and 4 is a front pile supporting means both forming a part of the hopper.

Located underneath the hopper and adjacent to the front pile supporting means is a rotating member 5, provided with suitable sheet separating members taking the form of pins 6 and suckers 7. Both or either may be used, or they may be used interchangeably. The sucker 7 communicates by means of the passage 8 with the longitudinal duct 9 in the rotating member. Said rotating member is mounted in suitable bearings 10 relatively stationary, one of which is provided with a chamber 11 in constant communication with the duct 9. A pipe 12 leads from said chamber 11 to a suitable exhaust (not shown). The rotating member 5 takes the leading edge of the lowermost sheet and deflects it out of the hopper. 13 is a second rotating member also located underneath the hopper but adjacent to the rear pile supporting means 3 and rotates in a direction opposite to that of the member 5. Underneath the members 5 and 13 is a third rotating member 14 rotating in the same direction as the member 5. The member 14 is provided with a reversing member 15 which engages the deflected portions of the sheet separated by the member 5 and presents it with its leading edge reversed to the member 13, which latter together with the friction surface 16 of the member 14 serves to remove the sheet 17 bodily from the hopper with its leading edge reversed.

Mounted on the member 5, intermediate of the sheet separating members, are the cams or eccentrics 18 on which rest the back feeding members 19 normally below the surface of the separating members. The members 19 are rotatable in the arms 20, which latter are pivoted on the framework at 21. Thus the rotation of the member 5 causes the back feeding members 19 to be raised into engagement with the next overlying sheet in the bottom of the pile during the removal of the lowermost sheet, and thus serve to retain the pile in its proper relation to the front pile supporting means 4. Mounted on the rotating member 5, in the rear of the separating members, but not necessarily in the same plane, are the wipers 22 which act to disengage the sheet from the separating members after the leading edge of the sheet has been deflected out of the hopper.

23 indicates slidable pile supporting means or fingers sliding in the framework. The function of the members 23 is to extend in under the open bottom of the hopper and prevent the pile from sagging during the removal of the lowermost sheet. These fingers 23 are conveniently operated from the cams 24 on the rotating member 5 by means of the cam levers 25 pivoted at 26 on the framework, and having each a cam roller 27 running in the cam 24, and connected to the members 23 at 28.

In order to jog the pile properly, there is provided at one side thereof a spring seated abutment member 29 and at the other side thereof the jogging member 30. This jogging member is mounted on two eccentrics 31 having gears 32 between which is an intermediate 33. The lower gear 32 meshes with the gear 34 on the member 5 and receives its motion therefrom. The motion thus imparted to the jogger is toward and downwardly with respect to the pile during the jogging movement, and upwardly and away from the pile in between jogging. This not only jogs the paper but feeds the pile toward the bottom without displacing it laterally.

At right angles to the jogger just described there are preferably rigid abutments 35 also forming a part of the hopper, and on the opposite side from the rigid abutments 35 is the rocking member 36 which squares the pile and is conveniently operated from the eccentric 37 and rod 38.

The member 13 is one of a series of rollers, another one of which is shown at 40, that coöperate with the member 14 to feed the sheet. Since each roller of the series is constructed alike only one need be described.

Carried by the member 14 is a gear 42, and with this gear meshes a pinion 43 mounted on the stud 44 in a relatively fixed bearing 45 and having at its end a member 46 provided with a groove 47. The roller 13 is mounted in the arms 48 which are pivotally supported on the shaft 49. At one outer end of the roller 13 there is a stud having a rounded portion 50 and a flat portion 51 which extends into a flattened socket 52 of the member 53, thereby rotatively engaging the roller 13, and the member 53. The member 53 is provided with a groove 54 at right angles to the groove 47 of the member 46; and interposed between 46 and 53 is a sliding member 55 having tongues 56 at right angles to each other and engaging with the grooves 47 and 54. A spring 57 on the rod 58 bears against the nut 59 and the arm 48, the lower end of the rod 58 being rigidly connected to a stationary portion 60 of the framing. By this means the roller 13 is able to move toward or away from the member 14 according to the thickness of the material passing between the two, and will be driven from the pinion 43 irrespective of its position and without disturbing the mesh between 42 and 43.

61 indicates a circumferential guide adjacent to 14 and 62 are straight guides onto which the paper may pass. The roller 40 and its operating parts are constructed like the roller 13, except that instead of being driven from the gear 42, it is driven from the bearers 100 on the member 14, and instead of having pinions like 43 it is provided with friction rollers 101 engaging with the bearers 100. Any suitable gearing may be employed but preferably power is derived from the shaft 102 having the gear 103 meshing with the pinion 104. 104 meshes with the gear 105 on the member 14. The member 14 carries the gear 42 meshing with the pinion 43, and the bearers 100 engaging the friction rollers 101. Moving with the member 14 is further the pinion 106 meshing with the intermediate 107 which in turn drives the pinion 108 on the member 5.

The machine operates as follows: The rotation of 5 causes the separating members 6 or 7 or both to seize the leading edge of the section in the hopper and to deflect it downwardly out of the hopper. The wiper 22 then pushes the paper off the separating members. The member 15 now engages the paper and presents its leading edge reversed to the roller 13, and the action of this roller and the surface 16 of the member 14 feeds the paper out of the hopper bodily. Meanwhile the cams 18 of the member 5 will lift the back feeding means 19 into engagement with the next overlying sheet and will tend to retain it in its position on the front pile supporting means. At this time also the slidable member 23 will have entered in under the pile to prevent it from sagging. Also the member 36 and the member 30 will jog the pile and feed the paper downward ready for the removal of the next sheet.

What is claimed, is:

1. A sheet individualizing device comprising: a hopper, a rotating member below the hopper for initially deflecting the leading edge of the sheet out of the hopper, a second rotating member, also below the hopper but rotating in a direction opposite to that of the first member, and a third rotating member acting to transfer the deflected leading edge from the first to the second rotating member and coöperating with the second member to feed the sheet out of the hopper bodily.

2. A sheet individualizing device comprising: a hopper, a rotating member below the hopper for downwardly deflecting the leading edge of the sheet out of the hopper, a second rotating member, also below the hopper but rotating in a direction opposite to that of the first member, and a third rotating member below the two members, rotating in the same direction as the first member for reversing the deflected leading edge of the sheet and for placing it between its own surface and that of the second member whereby the sheet is bodily removed from the hopper with its leading edge reversed.

3. A sheet individualizing device comprising: a hopper, means below the hopper for downwardly deflecting the leading edge of the lowermost sheet out of the hopper, means for feeding the sheet bodily out of the hopper after its leading edge has been deflected, and rotating means engaging with the next overlying sheet to retain it in the hopper while the lowermost sheet is being removed.

4. A sheet individualizing device comprising: a hopper, a rotating member below the hopper for downwardly deflecting the leading edge of the lowermost sheet out of the hopper, means for feeding the sheet bodily out of the hopper after its leading edge has been deflected, and means rotating in a direction opposite to that of the rotating member for engaging with the next overlying sheet to retain it in the hopper while the lowermost sheet is being removed.

5. In a sheet individualizing device: a hopper, a rotating member below said hopper, sheet separating members carried by said rotatable member for engaging with the lowermost sheet in the hopper, cams on said rotating member, rotatable back feeding members normally below the surface of the sheet separating members and resting on said cams, and means for movably supporting said rotatable back feeding members to permit the cams to raise and lower them and to rotate them in a direction opposite to that of the rotatable member, the timing of the cams being such that the back feeding members are raised to engage the next overlying sheet after the separating members have acted on the lowermost sheet.

6. A sheet individualizing device comprising: a hopper, a rotating member below said hopper, sheet separating members carried by said rotating member to downwardly deflect the lowermost sheet, means for bodily removing the deflected sheet from the hopper, cams on said rotating member, rotatable back feeding members normally below the surface of the sheet separating members and resting on said cams, and means for movably supporting said rotatable back feeding members to permit the cams to raise and lower them and to rotate them in a direction opposite to that of the rotating member, the timing of the cams being such that the back feeding members are raised to engage the next overlying sheet after the separating members have deflected the lowermost sheet.

7. A sheet individualizing device comprising: a hopper, means below the hopper for removing the lowermost sheet, rotatable back feeding means for the next overlying sheet, to retain it in the hopper while the lowermost sheet is being removed, below said hopper and normally inactive with relation to the sheet, and means for raising said back feeding means into contact with the next overlying sheet while the lowermost sheet is being removed.

8. A sheet individualizing device comprising: a hopper, means, including a rotating member, below the hopper for removing the lowermost sheet, rotatable back feeding means for the next overlying sheet, to retain it in the hopper while the lowermost sheet is being removed, below said hopper and normally inactive with relation to the sheet, and means, operated from the rotating member, for raising the back feeding means into contact with the next overlying sheet while the lowermost sheet is being removed and for rotating the said back feeding members in a direction opposite to that of the rotating member.

9. In a sheet individualizing device, a hopper, a rotating member adjacent said hopper, a sheet separating member carried by said rotatable member and adapted to engage with the outermost sheet in said hopper, and a wiper carried by said rotatable member in rear of said separating member for removing said sheet from said separating member.

10. A sheet individualizing device comprising: a hopper, a rotatable member adjacent said hopper, a sheet separating member carried by said rotatable member and adapted to engage with the leading edge of the outermost sheet to deflect the same out of the hopper, means for bodily removing the sheet from the hopper, after its leading edge has been deflected, and a wiper carried by said rotatable member in rear of said separating member for removing said sheet from said separating member.

11. A sheet individualizing device comprising: a hopper, a rotating member below the hopper for initially deflecting the leading edge of the sheet out of the hopper, a second rotating member, also below the hopper but rotating in a direction opposite to that of the first member, a third rotating member acting to transfer the deflected leading edge from the first to the second rotating member and coöperating with the second member to feed the sheet out bodily, and a wiper carried by said first rotating member for removing the sheet from said member.

12. A sheet individualizing device comprising: a hopper, a rotating member below the hopper for downwardly deflecting the leading edge of the sheet out of the hopper, a second rotating member, also below the hopper but rotating in a direction opposite to that of the first member, a third rotating member below the two members, rotating in the same direction as the first member for reversing the deflected leading edge of the sheet and for placing it between its own surface and that of the second member whereby the sheet is bodily removed from the hopper with its leading edge reversed, and a wiper carried by said first rotating member for removing the sheet from said member.

13. A sheet individualizing device comprising: a hopper, a rotating member below the hopper for downwardly deflecting the leading edge of the lowermost sheet out of the hopper, means for feeding the sheet bodily out of the hopper after its leading edge has been deflected, means rotating in a direction opposite to that of the rotating member for engaging with the next overlying sheet to retain it in the hopper while the lowermost sheet is being removed, and a wiper carried by said rotating member for removing the sheet from said member.

14. In a sheet individualizing device; a hopper, a rotating member below said hopper, sheet separating members carried by said rotatable member for engaging with the lowermost sheet in the hopper, cams on said rotating member, rotatable back feeding members normally below the surface of the sheet separating members and resting on said cams, means for movably supporting said rotatable back feeding members to permit the cams to raise and lower them and to rotate them in a direction opposite to that of the rotatable member, the timing of the cams being such that the back feeding members are raised to engage the next overlying sheet after the separating members have acted on the lowermost sheet, and a wiper carried by said rotating member in rear of the separating members for removing said sheet from the separating members.

15. A sheet individualizing device comprising: a hopper, a rotating member below said hopper, sheet separating members carried by said rotating member to downwardly deflect the lowermost sheet, means for bodily removing the deflected sheet from the hopper, cams on said rotating member, rotatable back feeding members normally below the surface of the sheet separating members and resting on said cams, means for movably supporting said rotatable back feeding member to permit the cams to raise and lower them and to rotate them in a direction opposite to that of the rotating member, the timing of the cams being such that the back feeding members are raised to engage the next overlying sheet after the separating members have deflected the lowermost sheet, and a wiper carried by said rotating member in rear of the separating members for removing the sheet from the separating member.

16. In a sheet individualizing device, a rotating member having a longitudinal duct, a stationary bearing for said rotating member having a chamber communicating with the longitudinal duct, an exhaust pipe from said chamber, a sucker carried by said rotating member and in communication with said duct, and a wiper carried by said rotatable member in rear of said sucker for disengaging a sheet from the sucker.

17. A sheet individualizing device comprising: a hopper, a rotating member adjacent thereto having a longitudinal duct, a stationary bearing for said rotating member having a chamber communicating with the longitudinal duct, an exhaust pipe from said chamber, a sucker, carried by said rotating member and in communication with said duct, for engaging the outermost sheet in the hopper to deflect the leading edge thereof, a wiper carried by said rotatable member in rear of said sucker for disengaging the sheet from the latter, and means for bodily removing the sheet from the hopper.

18. In a sheet individualizing device, a hopper, supporting a pile of paper, means for removing the sheets from the bottom of the hopper, means for jogging the pile comprising: a spring seated abutment member on one side of the pile and a jogging member on the other side of the pile, and means for imparting a movement to said jogging member toward the pile and downwardly with respect thereto, and upwardly and away therefrom.

19. In a sheet individualizing device, a hopper supporting a pile of paper, means for removing the sheets from the bottom of the hopper, a jogging member located adjacent to the pile, eccentrics rotating in the same direction supporting said jogging member, and means for rotating said eccentrics.

20. In a sheet individualizing device, a hopper supporting a pile of paper, means for removing the sheets from the bottom of the hopper, means for jogging the pile comprising, a spring seated abutment member on one side of the pile, a jogging member on the other side of the pile, eccentrics rotating in the same direction supporting said jogging member, and means for rotating said eccentrics.

21. In a sheet individualizing device, a hopper supporting a pile of paper, rotating means for removing the sheets from the bottom of the hopper, means for jogging the pile comprising a member having a movement toward the pile and downwardly with respect thereto during the jogging movement, and means for operating said jogging member from the rotating means.

22. In a sheet individualizing device, a hopper supporting a pile of paper, rotating means for removing the sheets from the bottom of the hopper, means for jogging the pile comprising: a spring seated abutment member on one side of the pile, and a jogging member on the other side of the pile, and means, operated from said rotating means, for imparting a movement to said jogging member toward the pile and downwardly with respect thereto and upwardly and away therefrom.

23. In a sheet individualizing device, a hopper supporting a pile of paper, rotating means for removing the sheets from the bottom of the hopper, a jogging member located adjacent to the pile, eccentrics rotating in the same direction supporting said jogging member, and means for rotating said eccentrics from the rotating means.

24. In a sheet individualizing device, a hopper supporting a pile of paper, rotating means for removing the sheets from the bottom of the hopper, means for jogging the pile comprising: a spring seated abutment member on one side of the pile, a jogging member on the other side of the pile, eccentrics rotating in the same direction supporting said jogging member, and means for rotating said eccentrics from said rotating means.

25. A sheet individualizing device comprising: a hopper having an open bottom, means for removing the sheets from the bottom of the hopper including a rotating member, sliding pile supporting means to engage the next overlying sheet while the lowermost sheet is being removed, and means directly connecting the sliding pile supporting means and the rotating member for reciprocating said sliding pile supporting means from the rotating member.

26. A sheet individualizing device comprising: a rotating member adjacent to the bottom, a sheet separating member carried thereby adapted to engage the lowermost sheet in the hopper, sliding pile supporting means to engage the next overlying sheet while the lowermost sheet is being removed, cam means on said rotating member, and means for reciprocating the sliding means from the cam means.

27. A sheet individualizing device comprising: a hopper having an open bottom, a rotating member adjacent said hopper, a sheet separating member carried thereby, to engage the lowermost sheet in the hopper, a movable pile engaging means for engaging the next overlying sheet while the lowermost sheet is being removed, means for actuating the movable pile supporting means from the rotating member, rotatable back feeding means for engaging the overlying sheet while the lowermost sheet is being removed, means for moving said back feeding means toward the bottom of the pile and for rotating it in a direction reverse to that of the rotating member actuated from said rotating member, a jogging member having a movement toward and downwardly of the pile during the jogging movement, and means for operating said jogging member from said rotating member.

Signed at New York city, in the county of New York and State of New York, this ninth day of November, A. D. 1915.

WARD B. STORY.